United States Patent [19]

Wiemer

[11] Patent Number: 4,675,804
[45] Date of Patent: Jun. 23, 1987

[54] CONTROL SYSTEM WITH VARIABLE GAIN INTEGRATOR

[75] Inventor: Douglas Wiemer, Rockford, Ill.

[73] Assignee: Sundstrand Corporation, Rockford, Ill.

[21] Appl. No.: 854,435

[22] Filed: Apr. 21, 1986

Related U.S. Application Data

[62] Division of Ser. No. 547,439, Nov. 1, 1983.

[51] Int. Cl.$^4$ ............................................. G05B 13/00
[52] U.S. Cl. ..................................... 364/161; 364/157; 318/609
[58] Field of Search ............... 364/154, 157, 161, 162, 364/163; 318/609, 610

[56] References Cited

U.S. PATENT DOCUMENTS

| | | | |
|---|---|---|---|
| 3,533,466 | 10/1970 | Salamon et al. | 165/122 |
| 3,632,251 | 1/1972 | Henry | 318/616 |
| 3,701,889 | 10/1972 | Barron et al. | 318/561 |
| 3,738,609 | 6/1973 | Divigard | 236/78 |
| 3,835,903 | 9/1974 | Masaki et al. | 165/23 |
| 3,882,368 | 5/1975 | Carleton | 318/610 |
| 3,946,297 | 3/1976 | Bechtel | 318/609 |
| 4,008,386 | 2/1977 | Ross | 318/610 |
| 4,250,543 | 2/1981 | Smith et al. | 318/561 |
| 4,262,737 | 4/1981 | Faillace | 165/12 |
| 4,265,263 | 5/1981 | Hobbs | 364/161 |
| 4,275,439 | 6/1981 | Kuwata | 318/610 |
| 4,390,942 | 6/1983 | de Keizer | 318/610 |
| 4,487,254 | 12/1984 | Hayashibara | 165/16 |
| 4,489,375 | 12/1984 | Putman | 364/161 |
| 4,556,956 | 12/1985 | Dickenson | 364/162 |

OTHER PUBLICATIONS

Bayless, R. F., "Three-Mode Pretuning of Temperature Controllers", *Plastics Engineering,* Mar. 1978, pp. 59-62.

Edwards, J. B. and Marshall, S. A., "Environmental Temperature Control", *The Heating and Air Conditioning Journal,* Apr. 1975, vol. 44, No. 521, p. 20.

*Primary Examiner*—Jerry Smith
*Assistant Examiner*—Allen MacDonald
*Attorney, Agent, or Firm*—Wood, Dalton, Phillips Mason & Rowe

[57] ABSTRACT

A variable gain integrator for controlling the response time of a controlled device so as to control a condition. The condition is sensed and compared to a set point to determine an error representing the difference therebetween. The difference is integrated by the variable gain integrator, the output of which is used to control the controlled device. The control system monitors the rate of change of the sensed condition. When the rate of condition change is less than a reference, the gain of the integrator is increased to decrease the response time of the controlled device.

9 Claims, 5 Drawing Figures

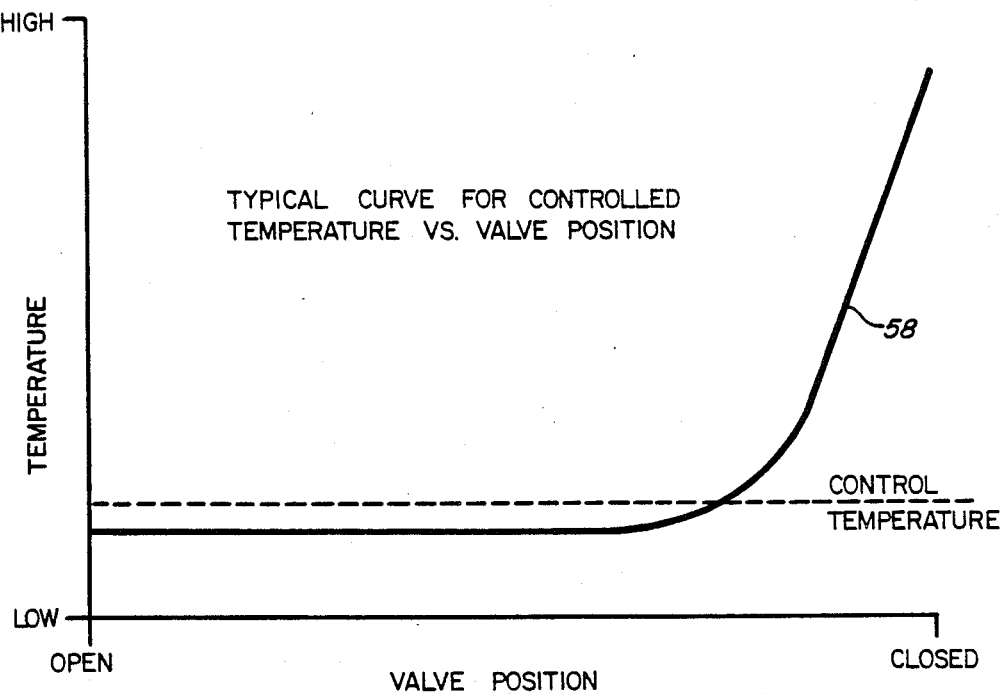
FIG. 3
FIG. 4
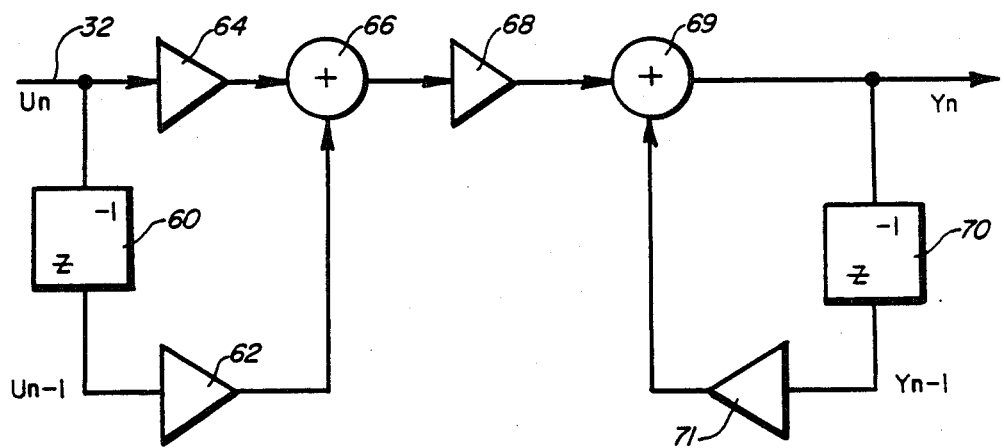

CONTROL SYSTEM WITH VARIABLE GAIN INTEGRATOR

This is a division of application Ser. No. 547,439 filed Nov. 1, 1983.

TECHNICAL FIELD

The present invention relates to a variable speed integrator and more particularly to a variable speed integrator for controlling the response time of a valve, the position of which is controlled to regulate the amount of coolant flowing to a heat exchanger.

BACKGROUND OF THE INVENTION

Known heat exchangers typically include a valve, the position of which regulates the amount of coolant flowing to the heat exchanger to control the temperature of the cooled substance output from the exchanger. Although the response times of the valve and system for controlling the valve are often critical, the response times may vary greatly over the operating range of the system. Known control systems are typically designed to maintain stability when the system is operating under the worst conditions for system stability, such as when the system has a high gain and a fast response time. When the system gains are low, however, the response times of such control systems are very slow which is undesirable for applications where a prompt response is critical.

DISCLOSURE OF THE INVENTION

In accordance with the present invention, the disadvantages of prior control systems having a slow response time under certain operating conditions as discussed above have been overcome.

The control system of the present invention includes a variable speed or variable gain integrator for controlling the response time of a valve which regulates the amount of coolant flowing to a heat exchanger so as to control the temperature of the cooled substance output from the exchanger. The position of the valve is adjusted by the control system in response to the temperature of the cooled substance as sensed at the output of the heat exchanger. An error temperature is derived from the difference between the sensed temperature and a signal representing the desired temperature of the cooled substance. The error signal is integrated by the variable speed integrator, the output of which is used in driving the valve into position.

The gain of the integrator is adjusted in order to decrease the response time of the valve so that the valve responds faster when the gain of the system is low. The system determines whether the gain is low by monitoring the rate of change of the temperature of the cooled substance at the output of the heat exchanger. If the rate of change is less than a reference rate of change, the gain of the integrator is increased. Upon detection of a higher gain or when the sensed temperature approaches the desired temperature, the gain of the integrator is decreased from the increased value. The gain of the integrator is increased only when it has been determined that the sensed temperature is below the desired temperature since lower system gains are expected in such cases. Further, an unstable situation may arise if the gain of the integrator were increased in response to the sensed temperature being both greater and less than the desired temperature.

The variable speed integrator of the present invention, by detecting the system gain in response to the rate of change of the sensed temperature, minimizes the response times of the system without sacrificing stability. These and other objects and advantages of the invention, as well as details of an illustrative embodiment, will be more fully understood from the following description and the drawings.

BRIEF DESCRIPTION OF THE DRAWINGS

FIG. 3 is a graph illustrating how the controlled temperature typically varies with the position of the control valve;

FIG. 4 is a control algorithm block diagram of the variable speed integrator of the present invention.

BEST MODE FOR CARRYING OUT THE INVENTION

Figure 1:
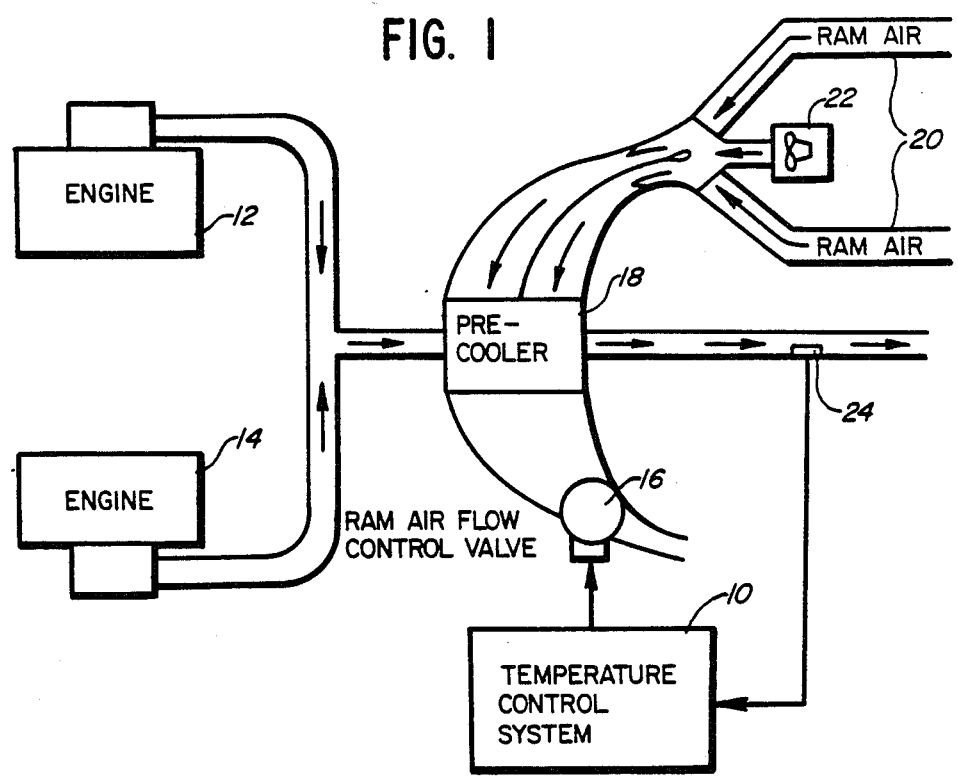
FIG. 1 is a block diagram illustrating the system for which the temperature control having the variable speed integrator of the present invention is employed.

A temperature control system 10 as shown in FIG. 1 is employed to control the cooling of bleed air from the engines 12 and 14 of an aircraft by regulating the position of a ram air flow control valve 16. The bleed air from the engines 12 and 14 is cooled by a precooler 18 which provides a heat exchange between the bleed air and a coolant. The coolant may be either ram air flowing from the outside of the aircraft while the aircraft is in flight or air from a ground blower 22 employed while the aircraft is on the ground. By moving the control valve 16 towards its open position, more coolant is allowed to flow to the precooler 18 so as to increase the cooling of the bleed air. Movement of the control valve 16 towards its closed position decreases the amount of coolant flowing to the heat exchanger to decrease the amount of cooling of the bleed air. The position of the valve 16 is controlled by the system 10 in response to the temperature of the cooled bleed air output from the precooler 18 as sensed by a temperature sensor 24 to maintain the temperature of the cooled bleed air at a desired level. The temperature sensor 24, positioned downstream of the precooler 18, may be a variable resistance device which provides a DC voltage output varying with the temperature of the cooled bleed air.

Figure 2:
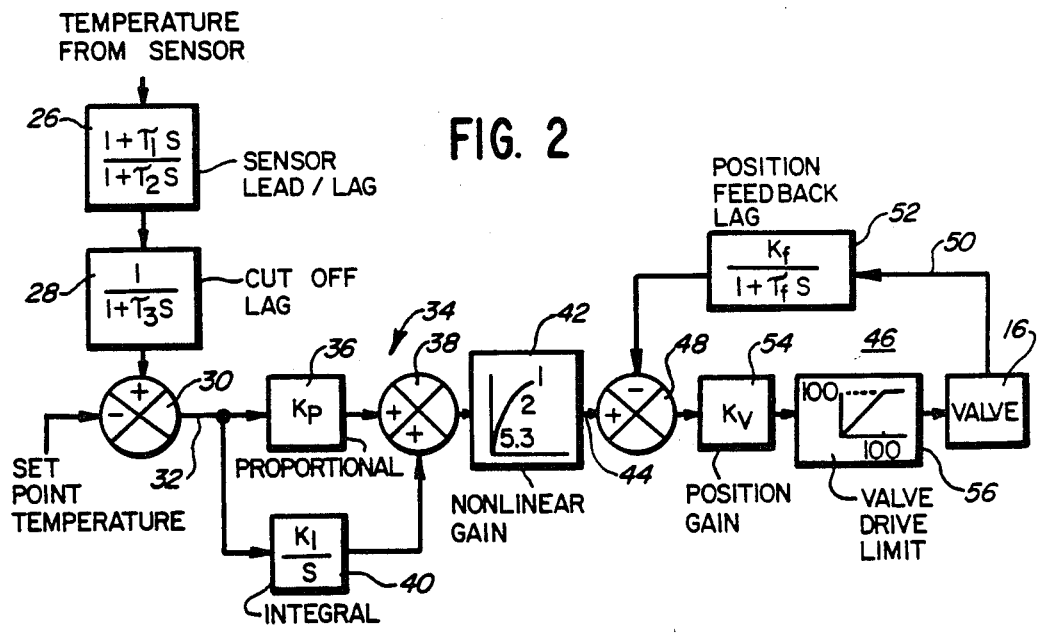
FIG. 2 is a block diagram of the temperature control system shown in FIG. 1.

The temperature control system 10 is shown in greater detail in FIG. 2. The temperature control system 10 may be an analog system. Preferably, however, the temperature control is a digital system including a microcomputer wherein the functions of each of the networks described below are carried out digitally in accordance with the respective transfer functions of the networks. When the temperature control system is a digital system including a microcomputer, the temperature sensed by the sensor 24 may be sampled periodically with a sample period of, for example, 26.21 milliseconds.

The temperature control 10 includes a lead/lag network to which a signal representing the temperature of the cooled bleed air as sensed by the sensor 24 is applied in order to reduce the time constant of the temperature sensor. The time constant of the sensor 24 may be on the order of 6–9 seconds, the lead/lag network 26 reducing the time constant to approximately 0.5 seconds. The transfer function of the lead/lag network 26 is $(1+\tau_1 s)/(1+\tau_2 s)$ where $\tau_1$ is the lead time constant and $\tau_2$ is the lag time constant. The output from the lead/lag network 26 is applied to a cutoff lag network 28 which attenuates the high frequency gain of the lead/lag network 26 beyond the frequency range of interest to reduce noise from the output of the network 26. The transfer function of the cutoff lag network 28 is $1/(1+\tau_3 s)$.

The output of the cutoff lag network 28 representing the temperature of the cooled bleed air is applied to the noninverting input terminal of a summing junction 30, to the inverting input terminal of which is applied a set point temperature representing the desired temperature of the cooled bleed air at the output of the precooler 18. The set point temperature applied to the summing junction 30 may be adjustable so as to provide a choice between a high set point temperature of, for example, 300° F. and a low set point temperature of, for example, 170° F. The output of the summing junction 30 represents the temperature error or difference between the sensed temperature of the cooled bleed air and the desired temperature of the cooled bleed air, the temperature error being applied to a proportional plus integral network generally designated 34.

The proportional plus integral network 34 maintains a zero steady-state error and further controls the response time of the valve as discussed in detail below. The network 34 includes a proportional gain stage 36 and an integrator 40, to each of which is applied the temperature error on line 32. The proportional gain stage 36 reacts immediately to a change in the temperature error whereas the integral 40 provides a trim control so that the output of a summing junction 38, to which the outputs of the stage 36 and integrator 40 are applied, tracks the actual temperature error. The transfer function of stage 36 is represented by the gain, $K_P$, of the stage, $K_P$ having a value of 0.0666%/°F. The transfer function of the integrator 40 is $K_I/s$ where $K_I$, the gain of the integrator, is variable as discussed in detail below.

The output of the summing junction 38 is coupled to a nonlinear gain network 42, the output of which on a line 44 represents the command position for the valve 16. The nonlinear gain stage 42 provides a gain of 5.3 in response to an input signal indicating that the valve position is between the open position and 66.7% closed, a gain of 2.0 when the input indicates that the valve position is between 66.7% and 83.3% closed and a gain of 1.0 when the input represents that the position of the valve is between 83.3% and 100% closed. The nonlinear gain stage is provided to compensate for nonlinear valve effects. The output of the nonlinear gain stage 42 representing the command position of the valve 16 is applied to a control loop 46 which drives the valve 16 into position.

The position control loop 46 includes a summing junction 48, to the noninverting input terminal of which is applied the command position on line 44 and to the inverting input terminal of which is applied a position feedback signal representing the actual position of the valve 16. The position feedback signal applied to the junction 48 is provided by a position feedback lag network 52 which is responsive to a signal on a line 50 representing the position of the valve 16. The transfer function of the feedback lag network 52 is $K_f/(1+\tau_f s)$. The output of the summing junction 48 is applied to a position gain stage 54 having a gain, $K_V$, of 32 ma/% to provide the drive for the valve 16. The output of the position gain stage 54 is coupled to the valve 16 through a valve drive limit network 56 which is a current limiter, provided to prevent overdriving of the valve.

FIG. 3 is an example of a typical curve 58 illustrating the temperature of the cooled bleed air as a function of the position of the valve 16. In controlling the bleed air temperature, a situation may arise in which the ram air control valve 16 is almost completely open and the temperature of the cooled bleed air, output from the precooler 18, is only slightly below the set point or desired temperature so that a large valve movement is required to bring the bleed air temperature into control. In such a case, if the gain of the integrator 40 is a fixed value, selected so as to maintain stability of the integrator when the system gain is high, i.e., when the valve 16 is near the closed position, the response time of the valve would be very long. In order to overcome this problem, the gain of the integrator 40 is increased when the gain of the system is low, i.e., when the valve 16 is near the open position, so as to increase the response time of the valve.

FIG. 4 is a block diagram of the variable gain digital integrator of the present invention. The temperature error, $U_N$, applied to the integrator on line 32 and generated in response to each sampled sensor temperature, is held or delayed by a block 60 for a time period equal to one sampling period or 26.2 m seconds. The held temperature error from block 60 and the subsequent temperature error, generated in response to the next successively sampled sensor temperature, are scaled by respective multipliers 62 and 64. The temperature errors applied to the multipliers 62 and 64 are scaled by the same constant as discussed below. The output of the multipliers 62 and 64 are applied to a summing junction 66 where the scaled temperature errors are added. The output of the summing junction 66 is applied to a multiplier 68.

The multiplier 68 multiplies the output of the summing junction 66 by a factor of $\frac{1}{2}^n$ which determines the gain of the integrator. For system stability when the system gain is high and the valve is near the closed position, an integrator gain, $K_I$, of $3.333 \times 10^{-3}$%/°F./sec, is obtained by setting n equal to 9 as discussed below. In order to increase the integrator gain by a factor of eight when the system gain is low, n is set equal to 6.

The output of the multiplier 68 is applied to a summing junction 69 where it is added to the last calculated integrator output, $Y_{N-1}$. The output of the summing junction 69 represents the present output, $Y_n$, of the integrator. The output, $Y_n$, of the integrator is also held or delayed by a block 70 for one sample period of 26.2 milliseconds to provide the post integrator output, $Y_{N-1}$. $Y_{N-1}$ is applied to a multiplier 71 which multiplies the input thereof by a constant.

To obtain an integrator gain of $3.333 \times 10^{-3}$%/°F./sec, the scaling factors of the multipliers 62, 64, 68 and 71 are selected as follows. The general form of the output $y_n$ of the integrator 40 shown in FIG. 4 is $$y_n = (a_0 u_n + a_1 u_{n-1})/2^n + b_1 y_{n-1} \quad (1)$$

where $a_0$, $a_1$ and $b_1$ are the respective scaling factors of the multipliers 64, 62 and 71 and $\frac{1}{2}^n$ is the scaling factor of the multiplier 68. The transfer function of the integrator 40, $K_I/s$, may be rewritten as $$\frac{K_I}{s} = \frac{3.333 \times 10 - 3}{s} = \frac{K(s + A)}{(s + B)} \quad (2)$$

where $A = \infty$, $B = 0$ and $K = (1/\infty)(3.333 \times 10^{-3})$. The general form of a network having a transfer function of $$\frac{K(s + A)}{(s + B)}$$

is $$y_n = a_0' u_n + a_1' u_{n-1} + b_1' y_{n-1} \quad (3)$$

where $$a_0' = \frac{-K(A + 2/\tau)}{(B + 2/\tau)} \quad (4)$$

$$a_1' = \frac{-K(A - 2/\tau)}{(B + 2/\tau)} \quad (5)$$

$$b_1' = \frac{(B - 2/\tau)}{(B + 2/\tau)} \quad (6)$$

and $\tau = 26.21$ msec, the sampling period.

Solving equations 4, 5 and 6 where $A = \infty$, $B = 0$ and $K = (1/\infty)(3.333 \times 10^{-3})$, the following values are obtained:

$$a_0' = a_1' = -4.3684 \times 10^{-5} \quad (7)$$

and $$b_1' = 1 \quad (8)$$

By substituting the values of $a_0'$, $a_1'$ and $b_1'$ into equation (3), $y_n$ may be written as $$y_n = -4.3684 \times 10^{-5} u_n - 4.3684 \times 10^{-5} u_{n-1} + y_{n-1} \quad (9)$$

Equation (7) has units of %/°F./26.2 msec, where % represents units of the valve position command. In order to write $y_n$ in terms of bits out/bits in/26.2 msec, equation (7) is scaled by the number of bits at the output of the integrator per unit % over the number of bits at the input of the integrator per °F. Where there are 28.2 bits/°F. at the input of the integrator and 400 bits/% at the output of the integrator, equation (7) is scaled by 14.1921 to provide $$y_n = -6.1995 \times 10^{-4} u_n + -6.1995 \times 10^{-4} u_{n-1} + y_{n-1} \quad (10)$$

Equation (8) is rewritten in the form of equation (1) as follows $$y_n = (-0.3174 u_n + -0.3174 u_{n-1})/2^9 + y_{n-1} \quad (11)$$

From equation 9 it is seen that the scale factors $a_0$ and $a_1$ of the multipliers 64 and 62 are both equal to $-0.3174$, the scale factor b1 of the multiplier 71 is 1 and the scale factor of the multiplier 68 is $\frac{1}{2}^9$ to obtain an integrator gain of $3.333 \times 10^{-3}$ %/°F./sec.

In order to increase the gain of the integrator when the system gain is low, the power of two of the scale factor of the multiplier 68 is decreased. For example, to increase the integrator gain by a factor of 8, the scale factor $\frac{1}{2}^9$ is changed to $\frac{1}{2}^6$. For a digital system employing a microcomputer, dividing by a factor of $2^n$ is accomplished by shifting the number to be multiplied to the right n places so that n is called the shift right scaler. The gain of the integrator 40 may therefore be varied by changing the value of the shift right scaler n.

Figure 5:
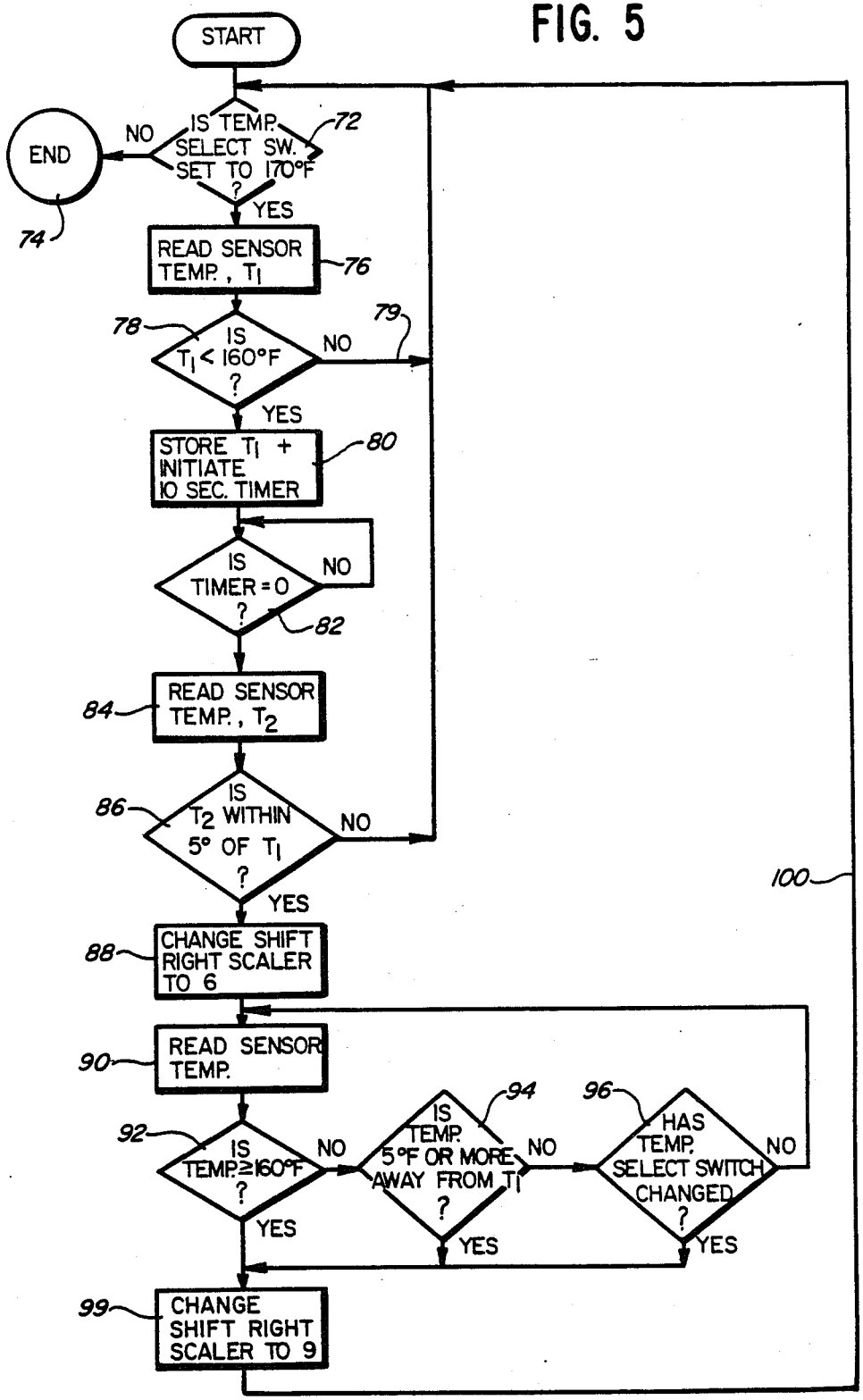
FIG. 5 is a flow chart of the control program to vary the gain of the integrator of FIG. 4.

FIG. 5 illustrates the control program employed to vary the gain of the integrator 40. First a determination is made by a block 72 as to whether the set point is equal to 170° F. If not, the integrator gain will not be varied and the program exits at block 74. If the set point is equal to 170° F., a block 76 reads a sampled sensor temperature, $T_1$. A determination is made by a block 78 as to whether the temperature, $T_1$, is less than a reference temperature of 160° F. which is ten degrees below the set point temperature. The gain of the integrator will not be varied if the sample temperature is greater than the reference temperature of 160° F., a path 79 being taken back to the block 72. If block 78 determines that the sampled temperature $T_1$ is less than the reference temperature of 160° F., the rate of change of the sampled temperature is monitored to determine whether the system gain is low.

In order to monitor the rate of change of the sampled temperature, the temperature $T_1$ is temporarily stored and a ten-second timer is initiated by a block 80. A block 82 checks the timer to determine when the ten-second period has expired. A block 84 then reads a temperature $T_2$ which is sampled ten seconds after reading $T_1$. If the temperature $T_2$ is within five degrees of the temperature $T_1$, indicating a low system gain, the gain of the integrator 40 is increased by a factor of eight by changing the shift right scaler, n, from 9 to 6 at a block 88.

During the time that the integrator gain is increased, the sensor temperature is read by a block 90 and a determination is made at a block 92 as to whether the temperature has increased to or above the reference temperature of 160° F. If not, a determination is made at a block 94 as to whether the temperature read at block 90 is 5° or more away from the temperature $T_1$ and if not a block 96 determines whether the set point has changed from 170° F. If the answer to any of the blocks 92, 94 or 96 is yes, the shift right scaler is changed back to 9 from 6 by a block 99. A path 100 is then taken back to block 72.

The variable speed integrator 40 and the control for varying the integrator gain in response to the rate of change of the cooled bleed air allows the response time of the valve to be minimized without sacrificing system stability.

I claim:

1. In a system for controlling a device to affect a condition, means for controlling the response time of the device comprising:

means for sensing said condition to provide a signal representing the sensed condition;

means for comparing the sensed conditions signal to a reference signal to provide an error signal representing the difference between the sensed condition signal and the reference signal;

means for integrating the error signal, said integrating means having a variable gain;

means responsive to the integrated error signal from said integrating means for operating the device to minimize the error signal;

means responsive to the sensed condition signal for monitoring the rate of change of the sensed condition to determine if the rate of change of the sensed condition is less than a reference rate of change; and means responsive to said monitoring means for varying the gain of said integrating means, said gain varying means increasing the gain of the integrating means when the rate of change of the sensed condition is less than the reference rate of change to decrease the response time of said device.

2. The controlling means of claim 1, wherein the gain varying means includes means for decreasing the gain of the integrating means when the signal representing the sensed condition is greater than a particular value.

3. The controlling means of claim 1, wherein the sensing means includes means for successively sampling the condition at fixed sampling intervals.

4. The controlling means of claim 3, wherein the monitoring means includes means for storing a sample of the condition if such sample is less than a particular value and means for comparing the stored condition sample to a subsequent sample of the condition wherein the gain varying means increases the gain of the integrating means when the subsequent sample exceeds the stored sample by less than a predetermined amount.

5. The controlling means of claim 4, wherein the gain varying means decreases the gain of the integrating means when the subsequent sample exceeds the stored sample by more than the predetermined amount.

6. The controlling means of claim 3, wherein the comparing means comprises each sample to the reference signal to develop successive condition error signals and wherein the integrating means includes means for holding each successive condition error signal for a time equal to the sampling interval, means for scaling a held condition error signal and a next successive condition error signal by a constant, first means for summing the scaled held condition error signal and the scaled next successive condition error signal, means for scaling the sum of the scaled condition error signals by a factor which is variable in magnitude, means for holding the output of the integrating means for a time equal to the sampling period and second means for summing the scaled sum and the held output of the integrating means to provide the next successive output of the integrating means whereby the gain varying means varies the magnitude of the variable scaling factor to vary the gain of the integrating means.

7. The control system of claim 6 wherein the variable factor scaling means divides the sum of the scaled condition error signals by a number which is a power of two whereby the gain varying means decreases the power to increase the gain.

8. The control system of claim 6, wherein the variable scaling factor is a number which is a power of two whereby the gain varying means varies the gain of the integrator by varying the power.

9. The control system of claim 18, wherein the sum of the scaled condition error signal is in the form of a word having a plurality of bits, the variable factor scaling means shifting the sum word a number of places equal to the power to scale the sum of the error signal by the variable scaling factor.

* * * * *